United States Patent
Kang et al.

(10) Patent No.: US 12,436,183 B2
(45) Date of Patent: Oct. 7, 2025

(54) TRAY ELEVATING AND LOWERING APPARATUS OF TEST HANDLER

(71) Applicant: SEMES CO., LTD., Cheonan-si (KR)

(72) Inventors: Jin Ho Kang, Cheonan-si (KR); Joo Hyun Seo, Cheonan-si (KR)

(73) Assignee: SEMES CO., LTD., Cheonan-si (KR)

( * ) Notice: Subject to any disclaimer, the term of this patent is extended or adjusted under 35 U.S.C. 154(b) by 489 days.

(21) Appl. No.: 17/870,047

(22) Filed: Jul. 21, 2022

(65) Prior Publication Data
US 2023/0024139 A1  Jan. 26, 2023

(30) Foreign Application Priority Data

Jul. 22, 2021 (KR) .................. 10-2021-0096690

(51) Int. Cl.
| | | |
|---|---|---|
| *G01R 31/28* | (2006.01) | |
| *G06F 3/01* | (2006.01) | |
| *G06F 3/0346* | (2013.01) | |
| *H01L 21/673* | (2006.01) | |
| *H01L 21/687* | (2006.01) | |

(52) U.S. Cl.
CPC ..... *G01R 31/2867* (2013.01); *G01R 31/2874* (2013.01); *G01R 31/2887* (2013.01); *G01R 31/2893* (2013.01); *G01R 31/2896* (2013.01); *G06F 3/011* (2013.01); *G06F 3/0346* (2013.01); *H01L 21/67303* (2013.01); *H01L 21/68792* (2013.01)

(58) Field of Classification Search
CPC ............ G01R 31/2867; G01R 31/2874; G01R 31/2887; G01R 31/2893; G01R 31/2896; H01L 21/67303; H01L 21/68792; G06F 3/011; G06F 3/0346

USPC ............................................ 324/757.01
See application file for complete search history.

(56) References Cited

U.S. PATENT DOCUMENTS

| | | | |
|---|---|---|---|
| 7,261,637 B2 | 8/2007 | Tokuoka et al. | |
| 2007/0176620 A1* | 8/2007 | Shim .................. | G01R 31/2893 324/756.07 |
| 2007/0182437 A1* | 8/2007 | Shim .................. | G01R 31/2867 324/750.19 |
| 2008/0265874 A1* | 10/2008 | Shim .................. | G01R 31/2893 324/757.01 |

(Continued)

FOREIGN PATENT DOCUMENTS

| | | |
|---|---|---|
| CN | 204361070 | 5/2015 |
| CN | 205944059 | 2/2017 |

(Continued)

OTHER PUBLICATIONS

KR 100293590 Machine Translation, Jul. 12, 2001 (Year: 2001).*

(Continued)

*Primary Examiner* — Raul J Rios Russo

(57) ABSTRACT

A tray elevator of a test handler includes a tray mounter on which a test tray is seated and having a support part and a through hole vertically penetrating the support part, a shaft vertically extending through the through hole of the tray mounter and configured to provide a path for elevating or lowering the tray mounter, a guide bushing including an outer surface and a groove at the outer surface, inserted into the through hole of the tray mounter, and configured to move along the shaft, and a ring inserted into the groove of the guide bushing.

15 Claims, 16 Drawing Sheets

(56) References Cited

U.S. PATENT DOCUMENTS

| | | | | |
|---|---|---|---|---|
| 2009/0153178 A1* | 6/2009 | Shim | .................. | G01R 31/2893 |
| | | | | 324/750.19 |
| 2010/0097089 A1* | 4/2010 | Shim | .................. | G01R 31/2893 |
| | | | | 324/757.01 |
| 2014/0203832 A1* | 7/2014 | Kim | .................. | G01R 31/2893 |
| | | | | 324/757.01 |

FOREIGN PATENT DOCUMENTS

| | | |
|---|---|---|
| JP | 2005-163804 | 6/2005 |
| KR | 10-1999-0075036 | 10/1999 |
| KR | 10-2000-0010422 | 2/2000 |
| KR | 10-2008-0102089 | 11/2008 |
| KR | 10-2014-0104629 | 8/2014 |
| WO | 2012-014899 | 2/2012 |

OTHER PUBLICATIONS

JP 2005163804 Machine Translation, Jun. 23, 2005 (Year: 2005).*
KR 20140104629 Machine Translation, Aug. 29, 2014 (Year: 2014).*
Office Action from the Korean Intellectual Property Office dated Dec. 25, 2023.
Office Action from the Taiwan Intellectual Property Office dated Jun. 8, 2023.

\* cited by examiner

Fig. 13A
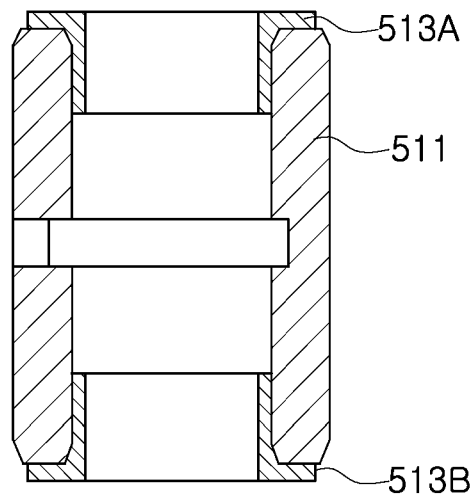
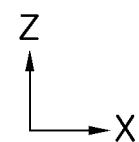
Fig. 13B
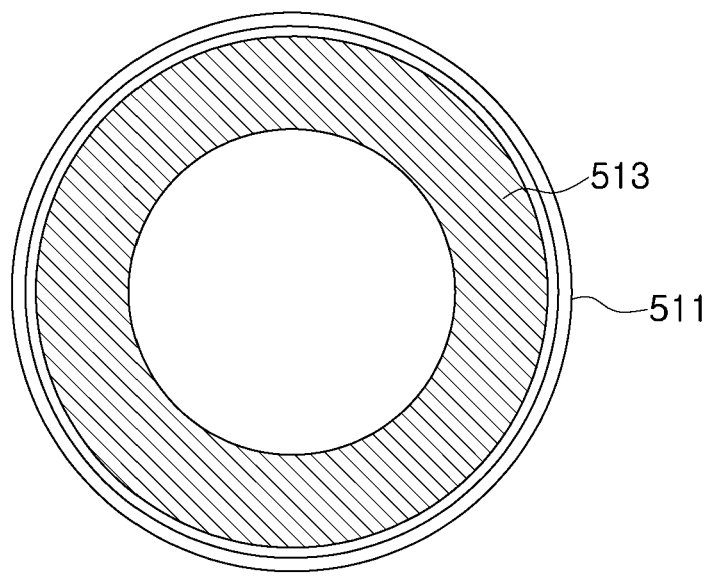
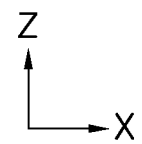

TRAY ELEVATING AND LOWERING APPARATUS OF TEST HANDLER

CROSS REFERENCE TO RELATED APPLICATION

The present application claims priority to Korean Patent Application No. 10-2021-0096690, filed Jul. 22, 2021, the entire contents of which is incorporated herein for all purposes by this reference.

BACKGROUND OF THE INVENTION

Field of the Invention

The present disclosure relates to a tray elevating and lowering apparatus of a test handler and, more particularly, to a tray elevating and lowering apparatus configured to transfer a tray having a semiconductor package mounted thereon, in a test handler configured to perform an inspection of a semiconductor package in a high or low temperature environment.

Description of the Related Art

In general, semiconductor devices may be provided on a silicon wafer used as a semiconductor substrate by repeatedly performing a series of manufacturing processes, and the semiconductor devices provided as described above may be manufactured into semiconductor packages through a dicing process, a bonding process, and a packaging process.

The manufactured semiconductor packages may be determined as good or defective through an electrical performance test. The test process may be performed using a test handler that is configured to handle the semiconductor packages and a tester that is configured to provide a test signal to inspect the semiconductor packages.

After accommodating the semiconductor packages in insert assemblies mounted on a test tray and then electrically connecting terminals for external connection of the semiconductor packages stored in the insert assembly to the tester, the test process may be performed. An interface board for connecting the semiconductor packages and the tester may be mounted on a sidewall of a test chamber for performing the test process, and socket boards for connection with the semiconductor packages may be disposed on the interface board. In addition, the interface board may be connected to the tester that is to provide the test signal to the semiconductor packages.

In performing such a test process, a process of arranging trays on which semiconductor packages are mounted in a vertical direction to fit an interface board is performed, and in this process, it is necessary to elevate the tray to an appropriate height. In general, a tray mounting member on which a tray is mounted is coupled by a shaft of a vertical direction and a bushing member and is elevated or lowered. However, when the test is performed in a high temperature or low temperature environment, deformation occurs in the shaft and the tray mounting member due to contraction at a low temperature or expansion at a high temperature, and in this process, wear and damage of the bushing member occurs, and furthermore, twisting of the tray mounting member happens.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems occurring in the related art, and an embodiment of the present disclosure provides a tray elevating and lowering apparatus capable of preventing abrasion and damage to a bushing member in a test handler configured to perform an inspection of a semiconductor package in a high or low temperature environment.

In addition, the embodiment of the present disclosure provides the tray elevating and lowering apparatus capable of preventing jamming and distortion of a tray mounting member in the test handler configured to perform the inspection of a semiconductor package in a high or low temperature environment.

Technical Problems to be solved of the present disclosure are not limited to the above, and other technical problems not mentioned will be clearly understood by those skilled in the art from the following description.

According to an embodiment of the present disclosure, a tray elevator of a test handler includes a tray mounter on which a test tray is seated and having a support part and a through hole vertically penetrating the support part, a shaft vertically extending through the through hole of the tray mounter and configured to provide a path for elevating or lowering the tray mounter, a guide bushing including an outer surface and a groove at the outer surface, inserted into the through hole of the tray mounter, and configured to move along the shaft, and a ring inserted into the groove of the guide bushing.

According to an embodiment of the present disclosure, a tray elevator of a test handler includes a tray mounter on which a test tray is seated and having a support part and a through hole vertically penetrating the support part, a timing belt pully configured to provide power for elevating or lowering the tray mounter, a fixed fastening member mounted on the tray mounter, a correction fastening member mounted on the timing belt pully and rotatably engaged with the fixed fastening member, the power provided by the timing belt pully being transferred to elevate or lower the tray mounter via the fixed fastening member and the correction fastening member engaged with each other, a shaft vertically extending through the through hole of the tray mounter and configured to provide a path for elevating or lowering the tray mounter, a guide bushing including an outer surface and a groove at the outer surface, inserted into the through hole of the tray mounter and configured to move along the shaft, and a ring inserted into the groove of the guide bushing.

According to an embodiment of the present disclosure, the test handler including: a loading section where a semiconductor package is carried in or taken out; a soak chamber configured to preheat or precool the semiconductor package mounted on a test tray; a test chamber configured to perform a test by pressing the semiconductor package transferred from the soak chamber with a test interface unit; a desoak chamber configured to discharge the semiconductor package on which the test has been completed to the loading section; and a tray elevating and lowering unit configured to elevate and lower the test tray in the soak chamber or the desoak chamber, wherein the tray elevating and lowering unit may include: a tray mounting member on which the test tray is seated; a shaft member configured to provide a path for elevating and lowering the tray mounting member; a guide bushing member inserted into a through hole of the tray mounting member and configured to move along the shaft member; and a ring member inserted into a groove provided on an outer surface of the guide bushing member and contacting an inner wall of the through hole of the tray mounting member to allow a constant distance between the inner wall of the through hole and the outer surface of the guide bushing member to be maintained.

As described above, according to the present disclosure, a ring member is coupled to an outside surface of a guide bushing member to provide a gap between an inner wall of a through hole of a tray mounting member and the guide bushing member, so it is possible to prevent the tray mounting member from being jammed and distorted in spite of thermal deformation.

In addition, according to the present disclosure, an inner side guide bushing member having a relatively low coefficient of friction is coupled to an inner surface of the guide bushing member, so it is possible to prevent abrasion and damage of the guide bushing member due to friction with a shaft member.

Effects of the present disclosure are not limited to those mentioned above, and other effects not mentioned will be clearly understood by those in the art from the description below.

BRIEF DESCRIPTION OF THE DRAWINGS

The above and other objectives, features, and other advantages of the present disclosure will be more clearly understood from the following detailed description when taken in conjunction with the accompanying drawings, in which:

FIGS. 13A and 13B are views showing an example of a guide bushing member having inner side bushing members coupled to opposite ends thereof, respectively;

DETAILED DESCRIPTION OF THE INVENTION

Figure 1:
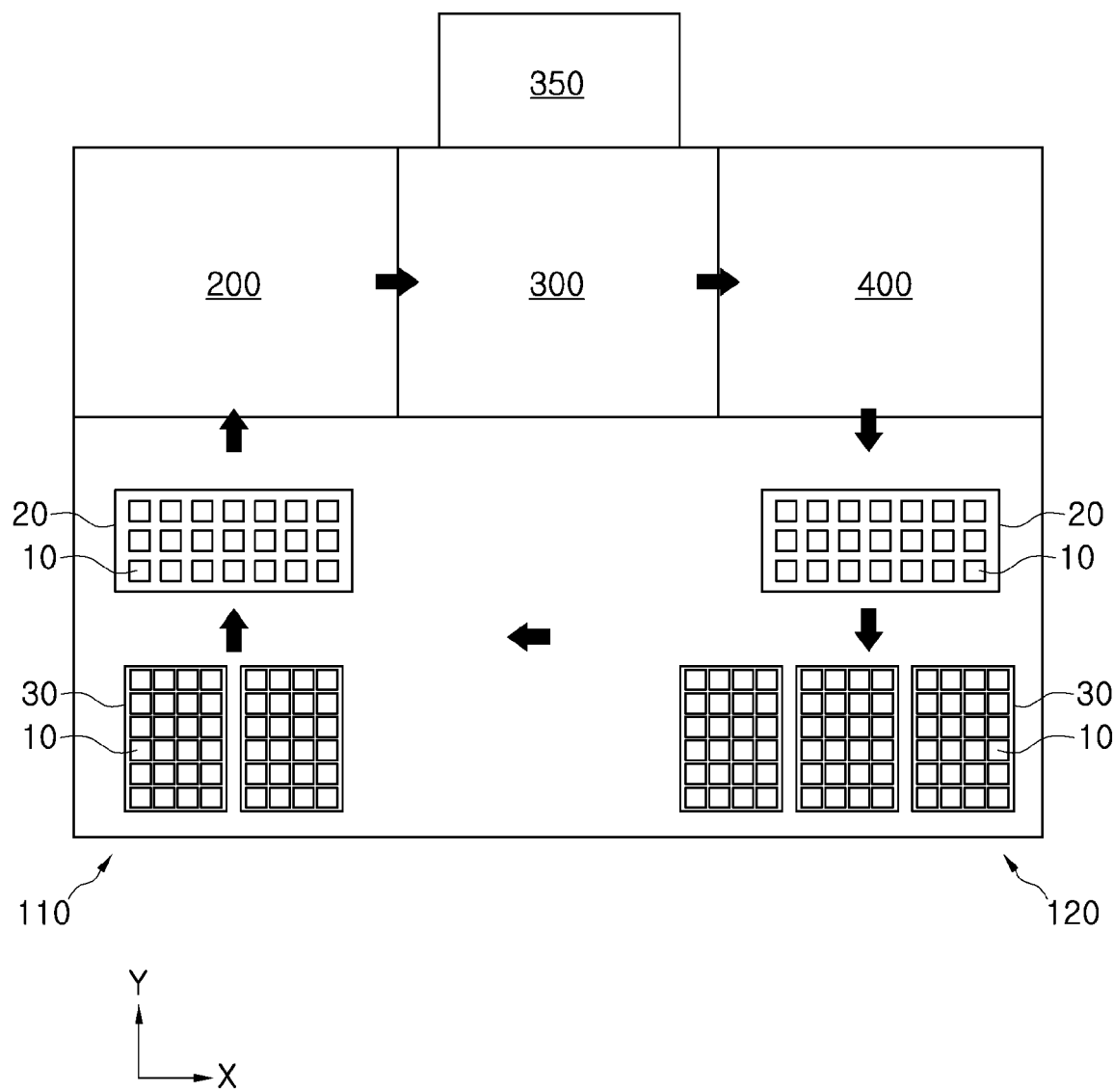
FIG. 1 is a view showing a schematic structure of a test handler to which the present disclosure may be applied.

Hereinafter, with reference to the accompanying drawings, embodiments of the present disclosure will be described in detail so as to be easily implemented by those of ordinary skill in the art to which the present disclosure pertains. The present disclosure may be embodied in several different forms and also is not limited to the embodiments described herein.

In order to clearly explain the present disclosure, parts irrelevant to the description are omitted, and the same reference numerals are assigned to the same or similar elements throughout the specification.

In addition, in various embodiments, components having the same configuration will be described only in the representative embodiment using the same reference numerals, and only configurations different from the representative embodiment will be described in other embodiments.

Throughout the specification, when a part is "connected (or coupled)" to another part, it includes not only a case of "directly connected (or coupled)" but also a case of "indirectly connected (or coupled) with other members interposed therebetween". In addition, when a part "includes" a certain component, this means that other components may be further included, rather than excluding the other components, unless otherwise stated.

Unless defined otherwise, all terms used herein, including technical and scientific terms, have the same meaning as commonly understood by one of ordinary skill in the art to which the present disclosure belongs. Terms such as those defined in commonly used dictionaries should be interpreted as having a meaning consistent with the meaning in the context of the related art and should not be interpreted in an ideal or excessively formal meaning unless explicitly defined in the present application.

FIG. 1 is a view showing a schematic structure of a test handler 100 to which the present disclosure may be applied. FIG. 1 is a schematic structural diagram of a test handler 100 viewed from a ceiling side. In the present specification, the test handler 100 refers to a device configured to electrically connect a semiconductor package 10 to a test interface in order to inspect a function and/or performance of the semiconductor package 10 on which semiconductor processing and packaging have been performed. In addition, for inspection of the semiconductor package 10, the test handler 100 may transfer the delivered semiconductor package 10 to a tray, create an environment (for example, temperature) for the inspection, classify the semiconductor package 10 that the inspection is completed according to grades, and take out of the semiconductor package 10 therefrom. In the present specification, a case in which the test handler 100 is connected to the test device through the test interface is described, but the embodiment of the present specification is not limited thereto, and the test handler 100 and the test device may be integrally configured. That is, the test handler 100 may also be referred to as the test device.

With reference to FIG. 1, the test handler 100 may include a loading unit 110, a soak chamber 200, a test chamber 300, a desoak chamber 400, and an unloading unit 120. First, a customer tray (or C-Tray) 30 accommodating the semiconductor package 10 to be inspected is put into the test handler 100. The loading unit 110 loads the semiconductor package 10 stored in the customer tray 30 into the test tray (or T-Tray) 20. Here, the test tray 20 and the customer tray 30 may have sizes, the numbers of slots capable of accommodating the semiconductor package 10, and distances between the slots, which are different, respectively. Although not shown, the loading unit 110 may include a pickup device for adsorbing the semiconductor package 10 and a driving unit and moving rails for moving the pickup device. The test tray 20 having the semiconductor package 10 mounted thereon may be transferred to the soak chamber 200 by a transfer device (not shown). The loading unit 110 and the unloading unit 120 may be collectively referred to as a loading section.

The soak chamber 200 is a space configured to store the test tray 20 and may be maintained as a temperature (first temperature) environment for testing. That is, the soak chamber 200 may store the test tray 20 transferred from the loading unit 110 at the first temperature. The first temperature is a temperature for presetting the semiconductor package 10 as a test temperature for testing in the test chamber 300. That is, the first temperature may be the same as the test temperature or a temperature similar to the test temperature. The test tray 20 stored in the soak chamber 200 may be transferred to the test chamber 300 by a transfer device (not shown).

The test chamber 300 is a space in which the inspection of the semiconductor package 10 is performed, by being coupled to the test interface 350 and provides an environment for testing the semiconductor package 10. The test interface 350 may be in contact with the semiconductor package 10 to apply an electrical signal and may transmit a signal output by the semiconductor package 10 to a test device (not shown). In the test chamber 300, a semiconductor device pressurizing apparatus configured to pressurize the semiconductor package 10 to bring the semiconductor package 10 into contact with the test interface 350 may be provided. The semiconductor package 10, which has been inspected in the test chamber 300, may be transferred to the desoak chamber 400.

The desoak chamber 400 is a space configured to store the test tray 20 having the semiconductor package 10 that has been inspected accommodated therein and may be maintained at a room temperature (second temperature). That is, the desoak chamber 400 may store the test tray 20 transferred from the test chamber 300 at the second temperature. The test tray 20 stored in the desoak chamber 400 may be transferred to the unloading unit 120 by a transfer device. The unloading unit 120 may classify according to grades and unload the semiconductor package 10 of the test tray 20 transferred from the desoak chamber 400.

Figure 2:
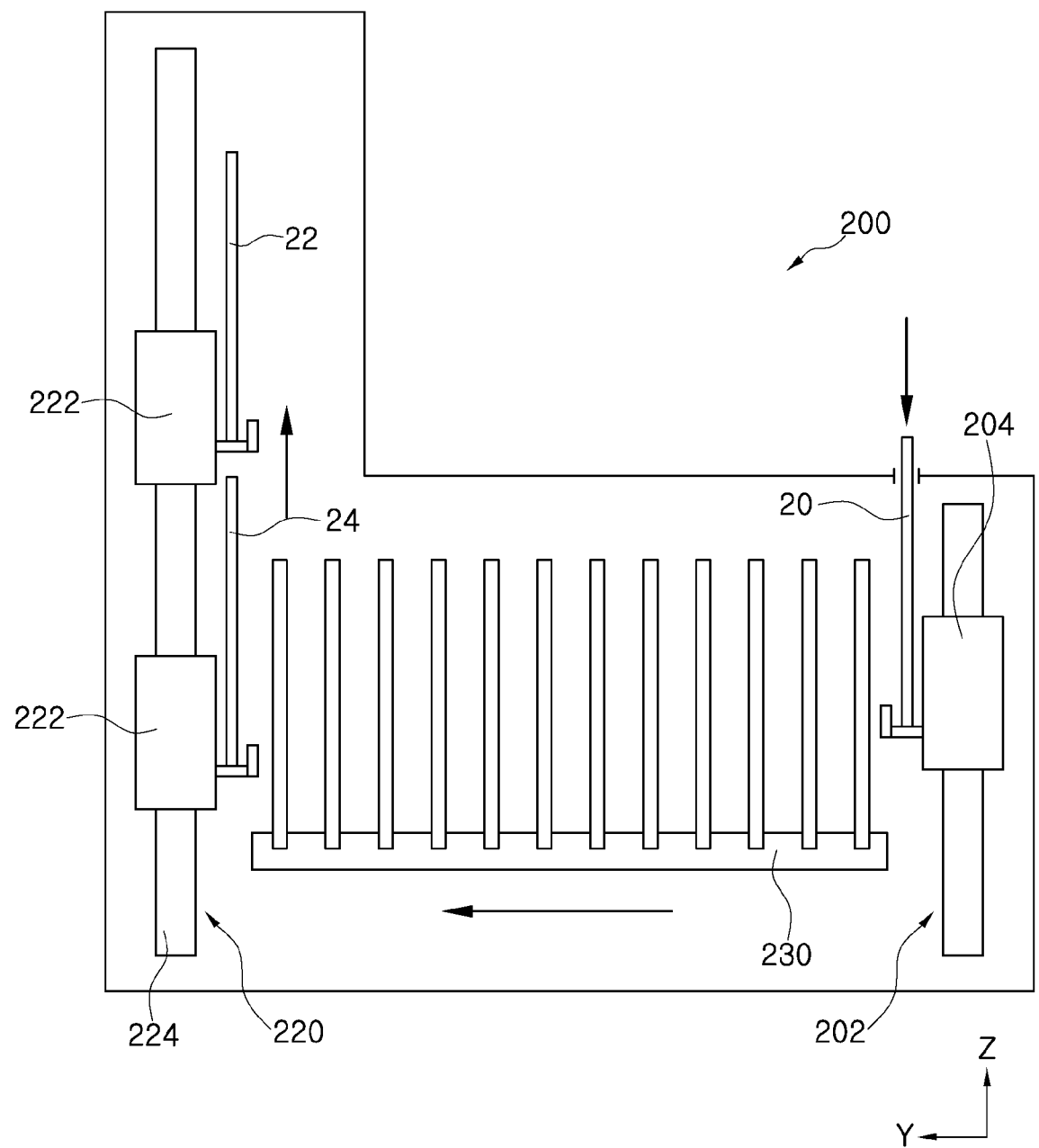
FIG. 2 is a view showing a schematic structure of a soak chamber in the test handler according to the present disclosure.

FIG. 2 is a view showing a schematic structure of a soak chamber 200 in the test handler 100 according to the present disclosure. FIG. 2 corresponds to an example of the soak chamber 200 shown in FIG. 1.

The soak chamber 200 provides a temperature control space for controlling the temperature of the semiconductor package 10. In the soak chamber 200, a carry-in inlet through which the test tray 20 is carried in is positioned at a position close to the loading unit 110, and the test tray 20 is carried into the soak chamber 200 in a state of being erected in a vertical direction (−Z direction). Although not shown, a rotation mechanism configured to rotate the test tray 20 from a horizontal direction (Y direction) to a vertical direction (Z direction) may be disposed at an upper end of the carry-in inlet of the soak chamber 200. A first elevating apparatus 202 for transferring the test tray 20 to the inside of the soak chamber 200 is disposed around the carry-in inlet. The first elevating apparatus 202 includes a first tray mounting member (i.e., a first tray mounter) 204 on which the test tray 20 is mounted. The test tray 20 seated on the first tray mounting member 204 is lowered by the first elevating apparatus 202 and positioned on a tray storage member 230.

The temperature set for the test is maintained inside the soak chamber 200, so the semiconductor package 10 mounted on the test tray 20 is preheated or precooled to the test temperature in advance for the duration that the test tray 20 is located on the tray storage member 230.

The tray storage member 230 is positioned at a lower end of the soak chamber 200, and the test tray 20 is stored by the tray storage member 230 in a state of being erected in the vertical direction (Z direction). The tray storage member 230 may include a plurality of slits, and the test tray 20 may be inserted into each slit. A horizontal transfer unit (not shown) configured to sequentially transfer the test tray 20 in a lump may be provided at an upper end and a lower end of the tray storage member 230. The horizontal transfer unit grips the test trays 20 seated on the tray storage member 230 at once and then releases a grip after moving by one slot distance. Accordingly, the test trays 20 are sequentially transferred starting from the test tray 20, which is put in first and positioned at a forward direction (−Y direction), to a second elevating apparatus 220 and then moved to the test chamber 300.

After receiving the test tray 20, the second elevating apparatus 220 is elevated in the vertical direction (Z direction) by a set distance and then puts the test tray 20 to be moved to the test chamber 300. The second elevating apparatus 220 includes a shaft member (i.e., a shaft) 224 which is a vertical drive shaft and a second tray mounting member (i.e., a second tray mounter) 222 configured to move in the vertical direction along the shaft member 224. Meanwhile, as shown in FIG. 2, the test trays 20 may be sent back to the test chamber 300 in a state of being stacked in the vertical direction (Z direction). That is, firstly, one test tray 20 is elevated in a state of being seated on an upper second tray mounting member 222 and positions at an upper stage, and then another test tray 20 is elevated to a relatively lower position in a state of being seated on a lower second tray mounting member 222 and positions at a lower stage. The test tray 20 seated on the upper second tray mounting member 222 becomes an upper test tray 22, and the test tray 20 seated on the lower second tray mounting member 222 becomes a lower test tray 24. The upper test tray 22 and the lower test tray 24 are transferred to the test chamber 300 by moving along a horizontal direction (X direction).

Figure 3:
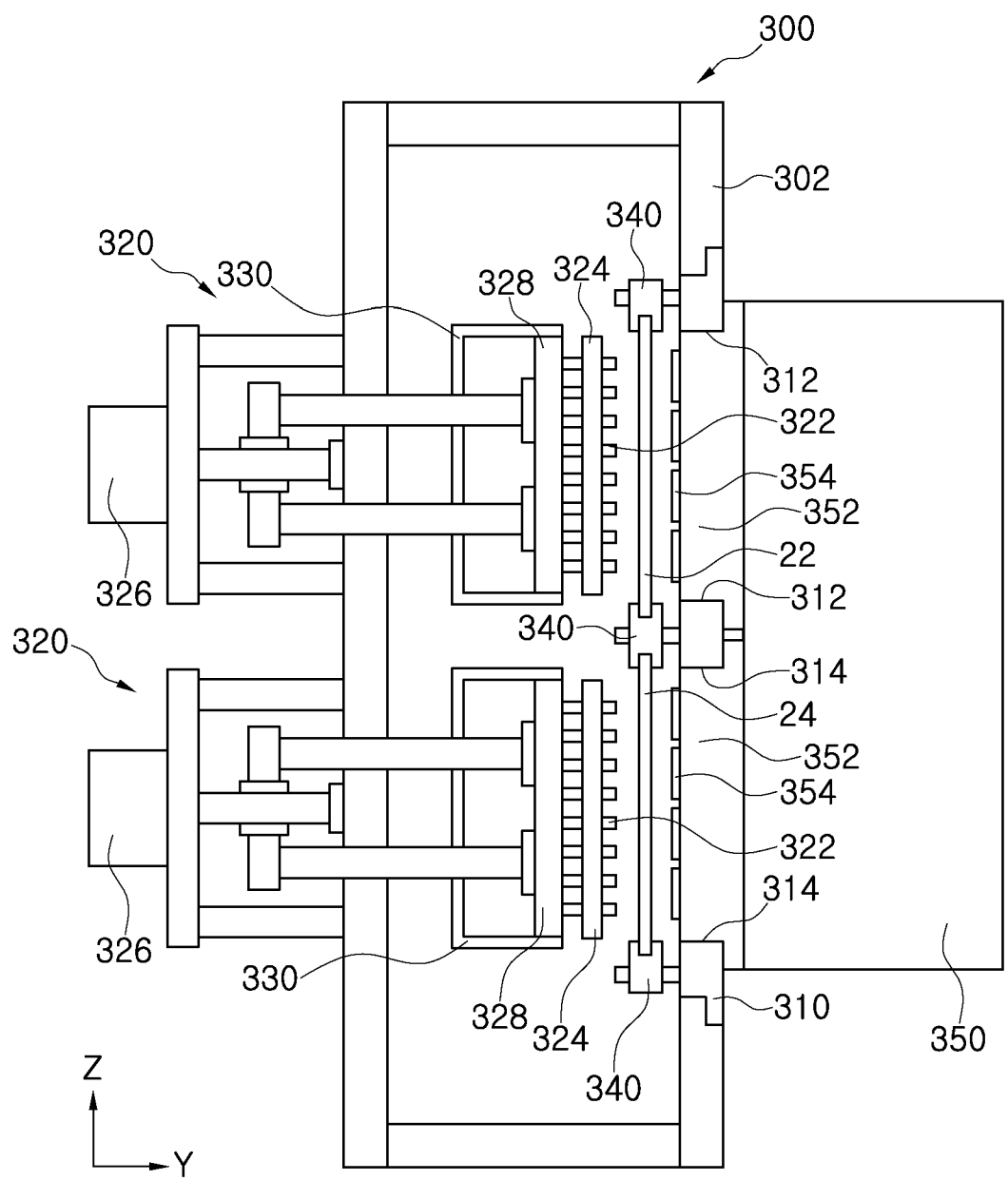
FIG. 3 is a view showing a schematic structure of a test chamber in the test handler according to the present disclosure.

FIG. 3 is a view showing a schematic structure of a test chamber 300 in the test handler 100 according to the present disclosure.

The test chamber 300 may provide a test space for electrical testing of the semiconductor package 10. As an example, as shown in FIG. 3, two sheets of the test trays 22 and 24 may be supplied to the inside of the test chamber 300 in a state of being stacked. A test interface 350 configured to provide test signals for the electrical testing of the semiconductor package 10 may be docked on the outer side of the sidewall 302 of the test chamber 300, and a plate 310 for a device under test (DUT) may be mounted on the sidewall 302 of the test chamber 300, the plate 310 having an upper opening 312 for connecting the semiconductor package 10 accommodated in the test tray 22 to the test interface 350 and a lower opening 314 for connecting the semiconductor accommodated in the lower test tray 24 to the test interface 350.

Interface boards 352 for electrically connecting the semiconductor package 10 and the test interface 350 may be disposed in the upper opening 312 and the lower opening 314, respectively, and socket boards 354 for connection to the semiconductor package 10 may be mounted on the interface boards 352.

The test chamber 300 may include a pushing unit 320 for bringing the semiconductor package 10 into close contact with the socket boards 354. The pushing unit 320 may include: Match plates 324 mounted with pushers 322 for bringing the semiconductor package 10 into close contact with the socket boards 354; driving units 326 for providing pressing force to the match plates 324, respectively; and pressing plates 328 for transferring the pressing force to the match plates 324, respectively. In addition, ducts 330 configured to provide a temperature control gas, for example, heated air or a cooling gas, for controlling the temperature of the pushers 322 may be coupled to the rear of the pressing plate 328, respectively.

Although not shown, the test handler 100 may include a second tray transfer unit (not shown) for transferring the upper test tray 22 and the lower test tray 24 from the soak chamber 200 into the test chamber 300. Guide rails 340 for guiding the upper test tray 22 and the lower test tray 24 may be mounted on the inner side surface of the DUT plate 310, and the tray transfer unit may move the upper test tray 22 and the lower test tray 24 from the second elevating apparatus 220 to the inside of the test chamber 300 along the guide rails 340.

Figure 4:
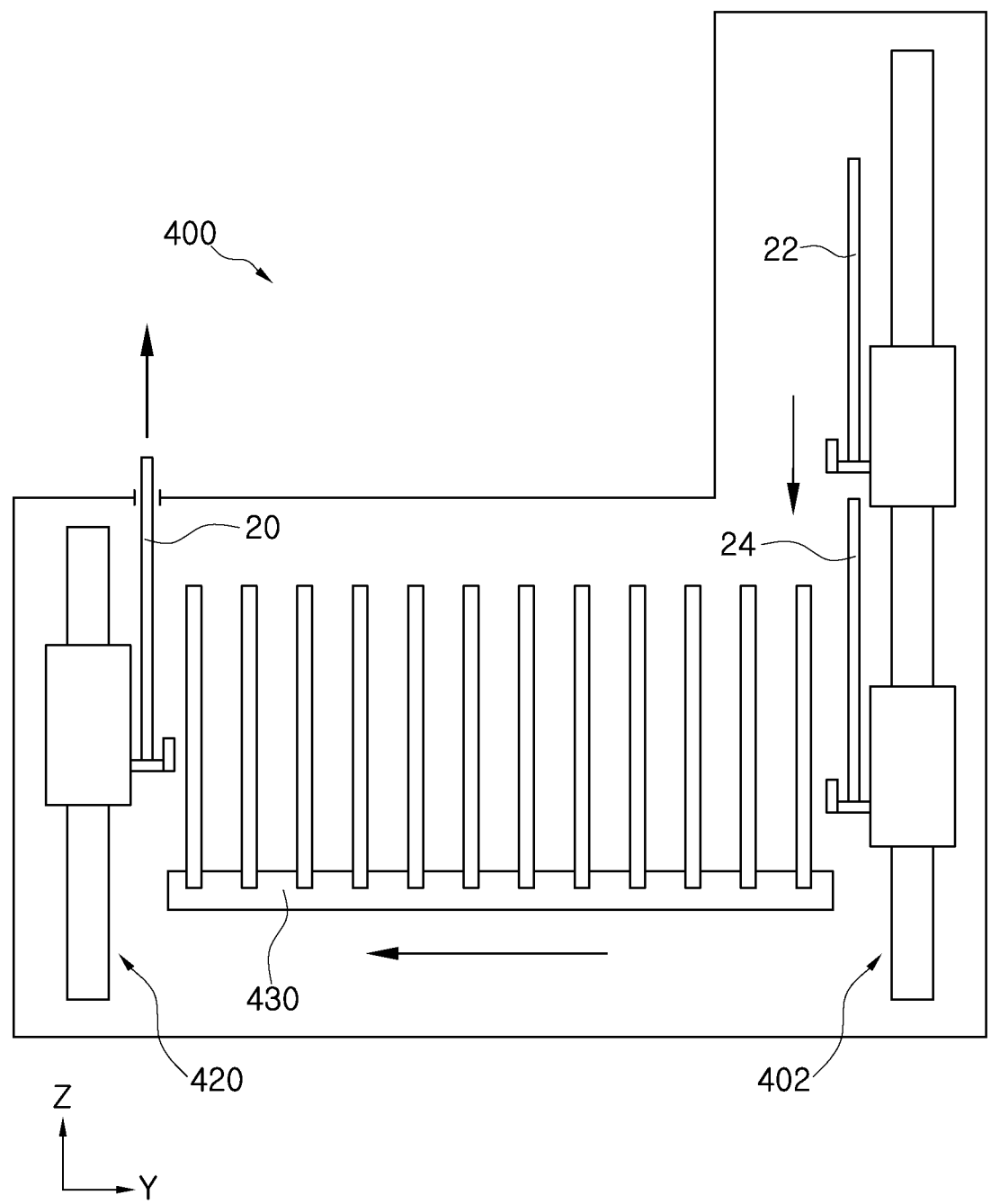
FIG. 4 is a view showing a schematic structure of a desoak chamber in the test handler according to the present disclosure.

FIG. 4 is a view showing a schematic structure of a desoak chamber 400 in the test handler 100 according to the present disclosure.

The desoak chamber 400 provides a space for restoring the temperature of the semiconductor package 10 to a room temperature. A third elevating apparatus 402 may be disposed on one side of the inside of the desoak chamber 400, and a fourth elevating apparatus 420 may be disposed on an opposite side of the inside of the desoak chamber 400. Although not shown, the test handler may include a tray transfer unit for moving the upper test tray 22 and the lower test tray 24 from the test chamber 300 to the inside of the desoak chamber 400, and the desoak chamber 400 may include a horizontal transfer unit (not shown) for moving the upper test tray 22 and the lower test tray 24 from the third elevating apparatus 402 to the tray storage member 430.

Figure 5:
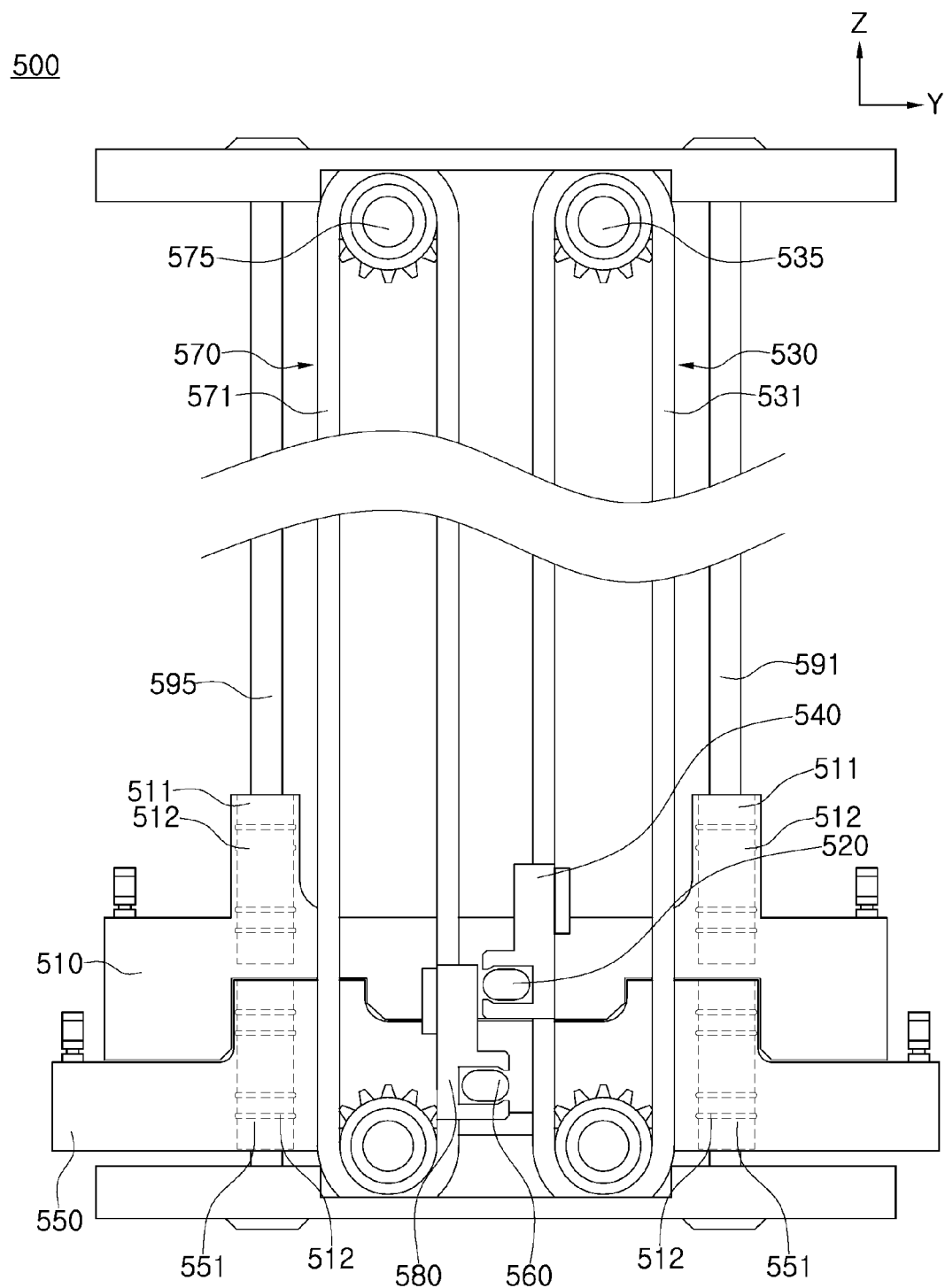
FIG. 5 is a view showing a tray elevating and lowering apparatus according to the present disclosure.

FIG. 5 is a view showing a tray elevating and lowering apparatus 500 according to the present disclosure. The tray elevating and lowering apparatus 500 of FIG. 5 is an example of the second elevating apparatus 220 described in FIG. 2.

The tray elevating and lowering apparatus 500 according to the present disclosure includes: tray mounting members 510 and 550 on each of which the test tray 20 is seated; shaft members 591 and 595 configured to provide paths, respectively, for elevating and lowering the tray mounting members 510 and 550; guide bushing members 511 and 551 inserted into through holes, corresponding thereto, of the tray mounting members 510 and 550, respectively, and configured to move along the shaft members 591 and 595; and ring members 512 inserted into grooves, corresponding thereto, provided on outer surfaces of the guide bushing members 511 or 551. The tray mounting members 510 and 550 include an upper tray mounting member 510 located at an upper portion and a lower tray mounting member 550 located at a lower portion. The shaft members 591 and 595 include a first shaft member 591 and a second shaft member 595 positioned on opposite sides, respectively. The guide bushing members 511 and 551 include upper guide bushing members 511 respectively inserted into the through holes of the upper tray mounting member 510 and lower guide bushing members 551 respectively inserted into the through holes of the lower tray mounting member 550.

In addition, the tray elevating and lowering apparatus 500 includes: wrapping connector driving members (i.e., timing belt pulleys 530 and 570 configured to provide power for moving the tray mounting members 510 and 550, respectively, in the vertical direction (Z direction); and correction fastening members 540 and 580 and fixed fastening members 520 and 560 for coupling the wrapping connector driving members 530 and 570 and the tray mounting members 510 and 550, respectively, to each other. The wrapping connector driving members 530 and 570 includes: chain members 531 and 571 each having opposite ends connected to each other and being capable of infinite rotation; and circular pulleys 535 and 575 having teeth configured to be coupled to the inner side of the chain members 531 and 571, respectively. Elevating and lowering driving units (not shown) rotate the pulleys 535 and 575, respectively, and the chain members 531 and 571 may rotate by the rotation of the pulleys 535 and 575, respectively. Meanwhile, the chain members 531 and 571 may be implemented with belts rather than a chain shape, respectively.

The fixed fastening members 520 and 560 are mounted to protrude on the tray mounting members 510 and 550, respectively, the correction fastening members 540 and 580 are mounted on the wrapping connector driving members 530 and 570, respectively, and the fixed fastening members 520 and 560 may be connected to the correction fastening members 540 and 580, respectively. Accordingly, the tray mounting members 510 and 550 may be elevated or lowered by the rotation of the chain members 531 and 571, respectively. Here, the correction fastening members 540 and 580 may be configured to be able to rotate about the fixed fastening members 520 and 560 as centers, respectively, so that directions of force applied to the tray mounting members 510 and 550 by movements of the wrapping connector driving members 530 and 570, respectively, may coincide with movement directions of the wrapping connector driving members 530 and 570, respectively.

Meanwhile, a high or low temperature environment is maintained inside the soak chamber 200 for inspection of the semiconductor package 10. Recently, a range of the temperature required for the semiconductor package 10 is widened, so a range of the temperature environment for testing is also expanding. An internal temperature of the soak chamber 200 may be set to about −60° C. for a low-temperature test and about +160° C. for a high-temperature test.

In the case of such a low or high temperature environment, thermal deformation such as contraction at a low temperature or expansion at a high temperature may occur in each part of the tray elevating and lowering apparatus 500. For example, in the case in which the shaft members 591 and 595 are each directly inserted into the through holes of the tray mounting members 510 and 550, when the shaft members 591 and 595 expand at the high temperature in the high temperature environment, the shaft members 591 and 595 are jammed in the tray mounting members 510 and 550. In this case, when the tray mounting members 510 and 550 are forcibly elevated and lowered in a state of being jammed, damage to the parts occurs.

In addition, when the shaft members 591 and 595 contract at the low temperature in the low temperature environment, a gap between each of the shaft members 591 and 595 and the tray mounting members 510 and 550 increases, so in this case, the tray mounting members 510 and 550 may be tilted in one direction.

The present disclosure is for preventing damage to parts and inclination of the tray mounting members 510 and 550 in spite of such thermal deformation and provides the tray elevating and lowering apparatus capable of preventing the tray mounting members 510 and 550 from being twisted while allowing a constant gap to be provided between each of the shaft members 591 and 595 and the tray mounting members 510 and 550.

In the present document, for convenience of explanation, a case in which the tray elevating and lowering apparatus 500 being provided in the soak chamber 200 is mainly described, but the tray elevating and lowering apparatus 500 may not only be provided inside the soak chamber 200 but also inside the desoak chamber 400. The tray elevating and lowering apparatus 500 may be implemented as a tray elevating and lowering unit for elevating or lowering the test tray 20 in the soak chamber 200 or the desoak chamber 400.

According to the present disclosure, cylindrical guide bushing members 511 and 551 are inserted with predetermined gaps into the through hole inner walls, corresponding thereto, of the tray mounting members 510 and 550, respectively. The ring members 512 are inserted into grooves provided on outer walls of the guide bushing members 511 and 551, respectively, to maintain gaps between the guide bushing members 511 and 551 and the through hole inner walls of the tray mounting members 510 and 550 corresponding thereto. Thus, even when thermal deformation occurs, the gaps between the guide bushing members 511 and 551 and the through hole inner walls of the tray mounting members 510 and 550 are maintained, so that the tray mounting members 510 and 550 corresponding thereto are prevented from being inclined.

In addition, an inner side bushing member 513 having a friction coefficient lower than that of the guide bushing members 511 and 551 is inserted into the inner wall of each of all of the guide bushing members 511 and 551. Thus, even when the shaft members 591 and 595 expand at the high temperature, each of the inner side bushing members 513 acts as a buffer to prevent damage to the parts associated therewith.

Figure 6:
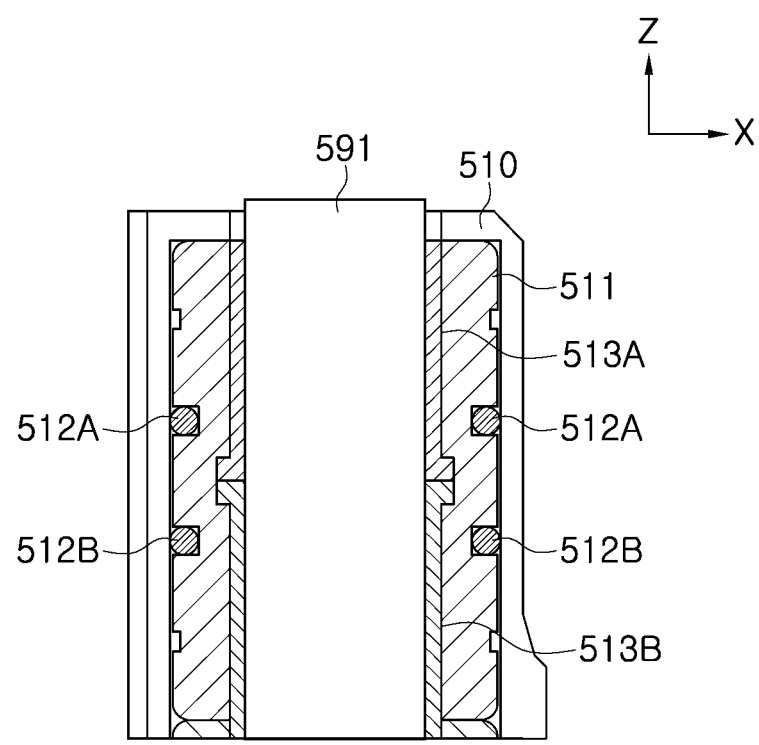
FIG. 6 is a sectional view of a guide bushing member and a shaft member coupled to the tray elevating and lowering apparatus according to the present disclosure.

FIG. 6 is a sectional view of a guide bushing member (i.e., a guide bushing) and a shaft member coupled to the tray elevating and lowering apparatus according to the present disclosure. With reference to FIG. 6, the guide bushing member 511 is inserted into the inside of the tray mounting member 510, and the ring member 512 is inserted into a/the groove provided in an outer wall of the guide bushing member 511. In addition, the inner side bushing member 513 is inserted into the inner side wall of the guide bushing member 511. The ring member 512 may include or may be an upper O-ring 512A positioned at an upper portion and a lower O-ring 512B positioned at a lower portion. The upper O-ring 512A and the lower O-ring 512B are each positioned alone and each act as a buffer, so it is possible to prevent the tray mounting member 510 from shaking about the vertical direction (Z direction) as a center. In an embodiment, the upper O-ring 512A and the lower O-ring may include or may be formed of an elastic material.

Figure 7A:
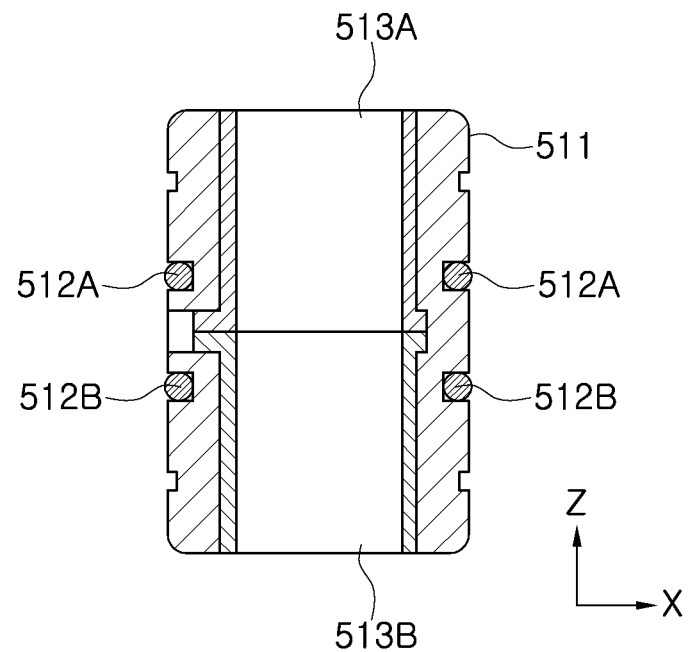
FIGS. 7A and 7B are views showing an example of the guide bushing member having an outer side on which an O-ring is coupled.
Figure 7B:
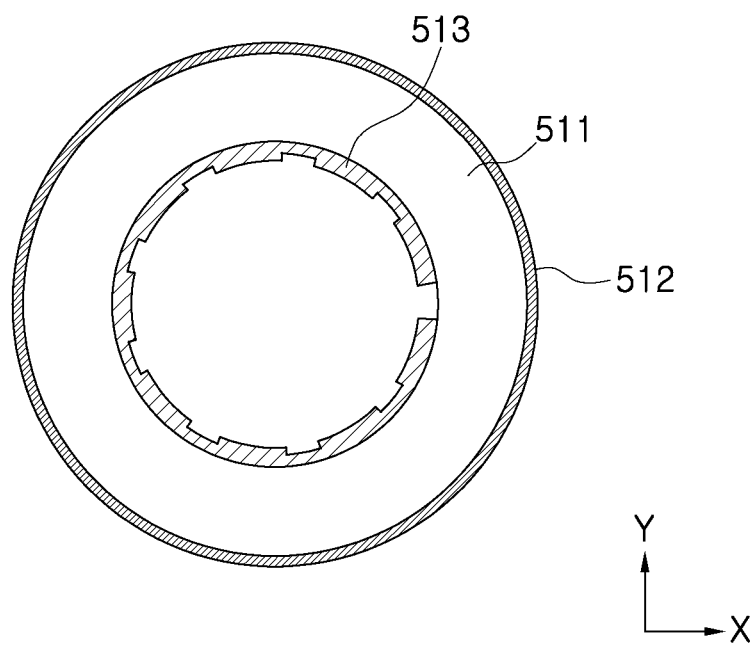

FIGS. 7A and 7B are views showing an example of the guide bushing member having an outer side on which an O-ring is coupled. FIG. 7A is a sectional view of the guide bushing member 511, and FIG. 7B is a view showing the guide bushing member 511 viewed from above. With reference to FIGS. 7A and 7B, the ring member 512 is inserted into the groove provided on the outer side wall of the guide bushing member 511. In addition, the inner side bushing member 513 is inserted into the inner side wall of the guide bushing member 511.

As shown in FIG. 7A, a mounting groove for mounting the inner side bushing member 513 is provided in an inner side center of the guide bushing member 511, and the inner side bushing member 513 includes a pair of inner side bushing members 513A and 513B, which are made of a polymer, and each of which includes a flange portion provided to be able to be inserted into the mounting groove. Configuring the pair of inner side bushing members 513A and 513B to be inserted into one guide bushing member 511 is for ease of assembly. That is, the flange portion of one inner side bushing member 513A is inserted into the inner mounting groove of the guide bushing member 511, and subsequently, the flange portion of another inner side bushing member 513B is inserted into the inner mounting groove of the guide bushing member 511, whereby easy assembly is possible.

Figure 8:
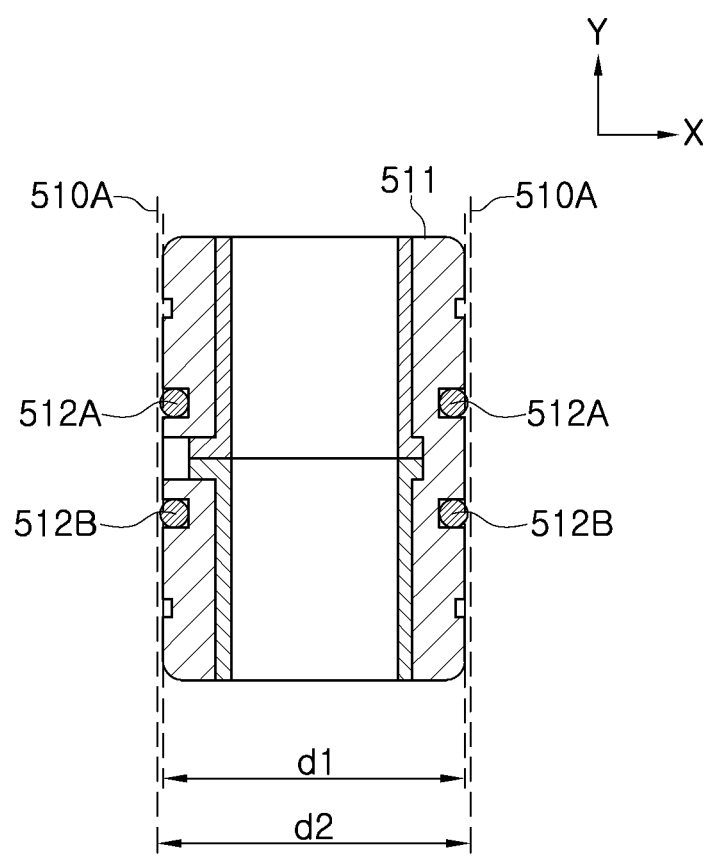
FIG. 8 is a view explaining a floating type bushing member with respect to a through hole in the tray elevating and lowering apparatus.

With reference to FIG. 8, a diameter d1 of the guide bushing member 511 is set to be smaller than a diameter d2 of the through hole of the tray mounting member 510. That is, a certain gap exists between the outer wall of the guide bushing member 511 and the inner wall 510A of the through hole of the tray mounting member. The ring member 512 protrudes exceeding the outer surface of the guide bushing member 511 and is configured to contact the through hole inner wall 510A. Thus, even when thermal deformation occurs, the gap between the guide bushing member 511 and the through hole inner wall 510A of the tray mounting member 510 may be maintained, and the tray mounting members 510 and 550 may be prevented from being tilted.

According to the present disclosure, a plurality of grooves is provided on the outer surface of the guide bushing member 511, and the ring member 512 includes a plurality of O-rings 512A and 512B respectively inserted into the plurality of grooves. The upper O-ring 512A and the lower O-ring 512B are each positioned alone, so it is possible to prevent the tray mounting member 510 from shaking about the vertical direction (Z direction) as the center.

According to the present disclosure, the inner side bushing member 513 attached to the inside of the guide bushing member 511 and configured to contact the shaft member 591 is provided. The inner side bushing member 513 may be made of a polymer material having a lower friction coefficient than the guide bushing member 511. Thus, even when the shaft member 591 expands at the high temperature, the inner side bushing member 513 may act as a buffer, thereby preventing the parts from being damaged. Meanwhile, for the convenience of assembly, the inner side bushing member 513 may be composed of an upper inner side bushing member 513A and a lower inner side bushing member 513B.

In addition, as shown in FIG. 7B, the inner side bushing member 513 may have a cylindrical shape having a portion opened. As shown in FIG. 7B, the inner side bushing member 513 is configured to be opened by about 5 degree angle in a partial region of the inner side bushing member 513. 511, whereby, even when the guide bushing member 511 is contracted at the low temperature, the inner side bushing member 513 may uniformly contact the shaft member 591 and the guide bushing member.

Figure 9A:
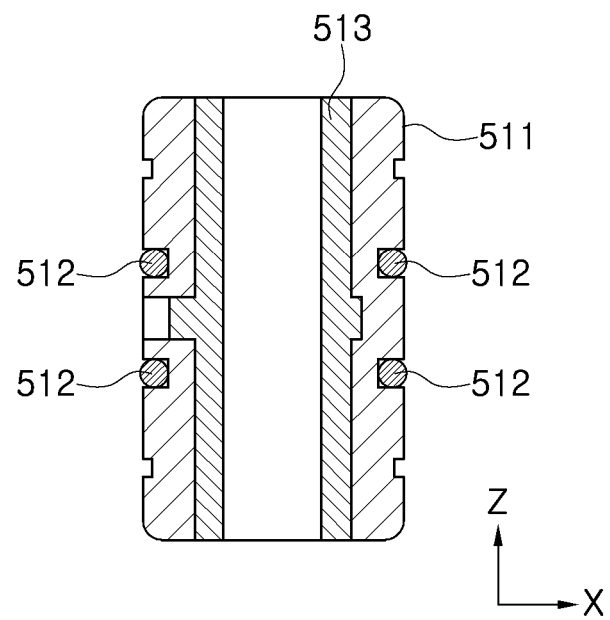
FIGS. 9A and 9B are views showing another example of a guide bushing member having a portion opened.
Figure 9B:
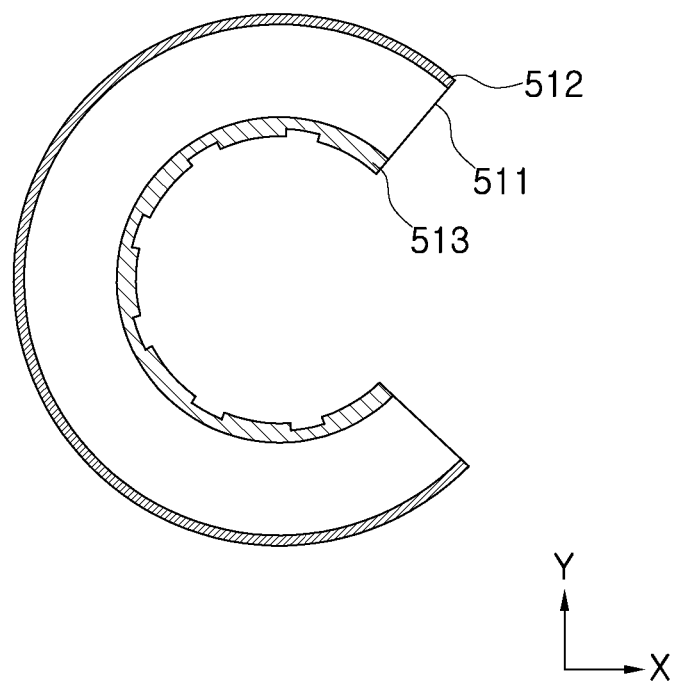

FIGS. 9A and 9B are views showing another example of a guide bushing member having a portion opened. With reference to FIGS. 9A and 9B, the guide bushing member 511 and the inner side bushing member 513 have a "C" shape having a portion open by about a 90 degree angle. And, the ring member 512 is inserted into the groove provided on the outer surface of the guide bushing member 511 and, likewise, may have a "C" shape having a portion open by an about 90 degree angle. The guide bushing member 511 is configured as in FIGS. 9A and 9B, whereby, even when thermal deformation occurs, the inner side bushing member 513 may contact the shaft member 591 in uniform, and the ring member 512 may contact the inner wall of the through hole of the tray mounting member 510 uniformly.

Meanwhile, in addition to the case in which the ring member 512 is inserted into the groove of the outer surface of the guide bushing member 511 as described above, the guide bushing member 511 of various structures may be used.

Figure 10A:
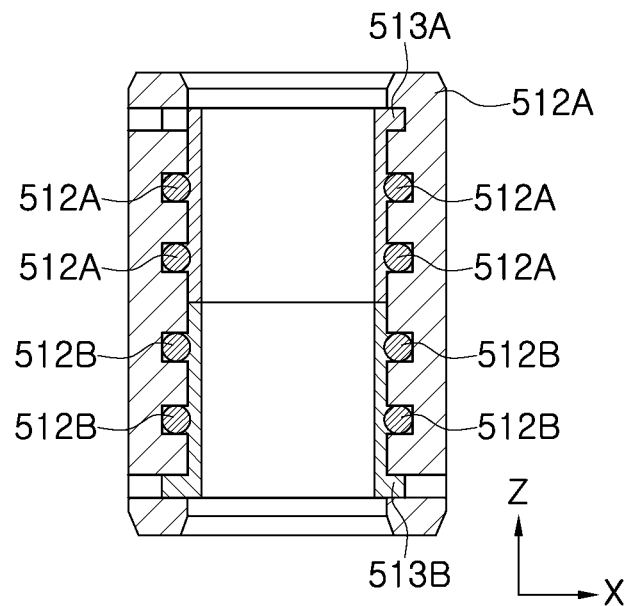
FIGS. 10A and 10B are views showing an example of the guide bushing member having an inner side on which an O-ring is coupled.
Figure 10B:
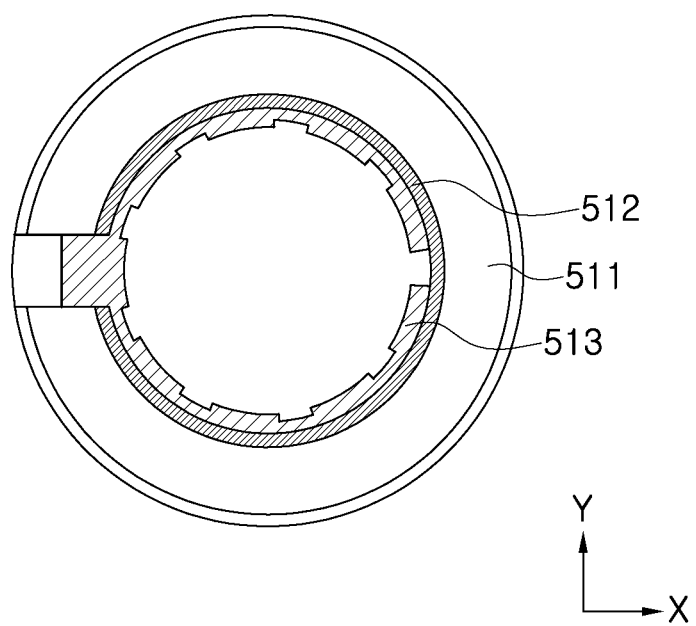

With reference to FIGS. 10A and 10B, a plurality of grooves may be provided on the inner side wall of the guide bushing member 511, and a ring member (i.e., a ring) 512 may be inserted into each of the grooves. The ring member 512 may include upper O-rings 512A inserted into upper grooves and lower O-rings 512B inserted into lower grooves. After the ring member 512 is inserted into the inner wall grooves of the guide bushing member 511, the inner side bushing member 513 is inserted into the guide bushing member 511. The inner side bushing member 513 may be composed of an upper inner bushing member 513A and a lower inner bushing member 513B for convenience of assembly.

Figure 11A:
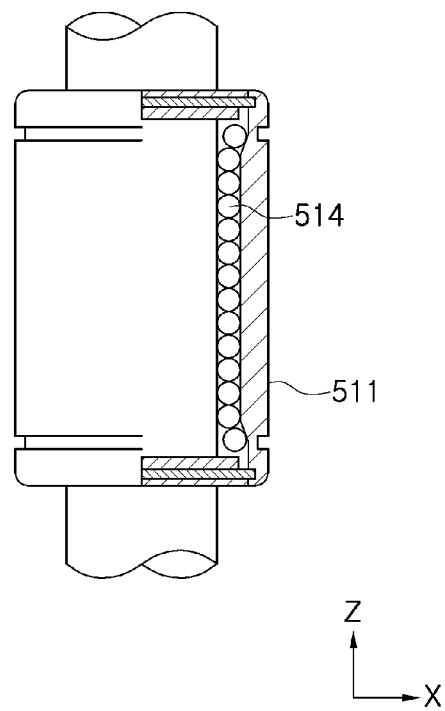
FIGS. 11A and 11B are views showing an example of a ball bearing type guide bushing member.
Figure 11B:
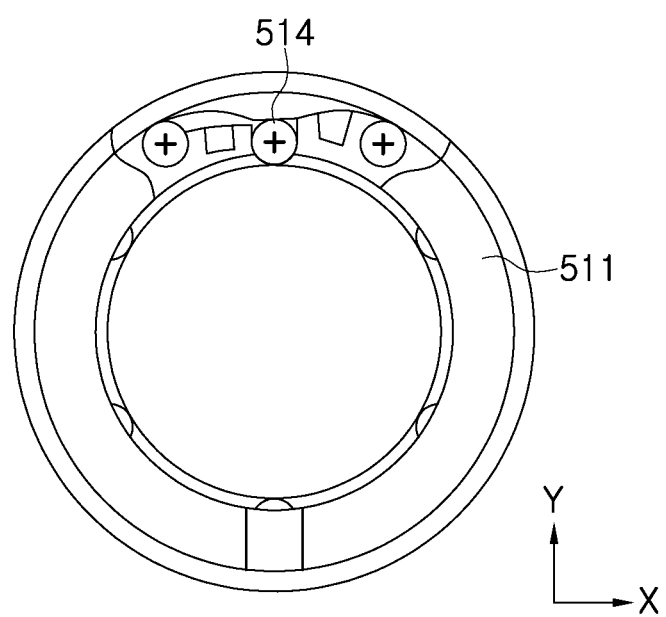

As shown in FIGS. 11A and 11B, a ball bearing guide bushing member 511 may be used. With reference to FIGS. 11A and 11B, the guide bushing member 511 may include a ball bearing member 514, on the inner surface, configured to rotate in contact with the shaft member 591 and an inner wall of the guide bushing member 511.

Figure 12A:
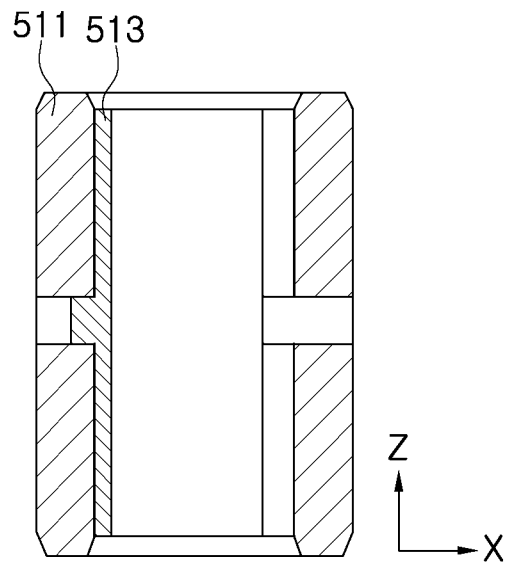
FIGS. 12A and 12B are views showing an example of the guide bushing member to which an inner side bushing member having a portion opened is coupled.
Figure 12B:
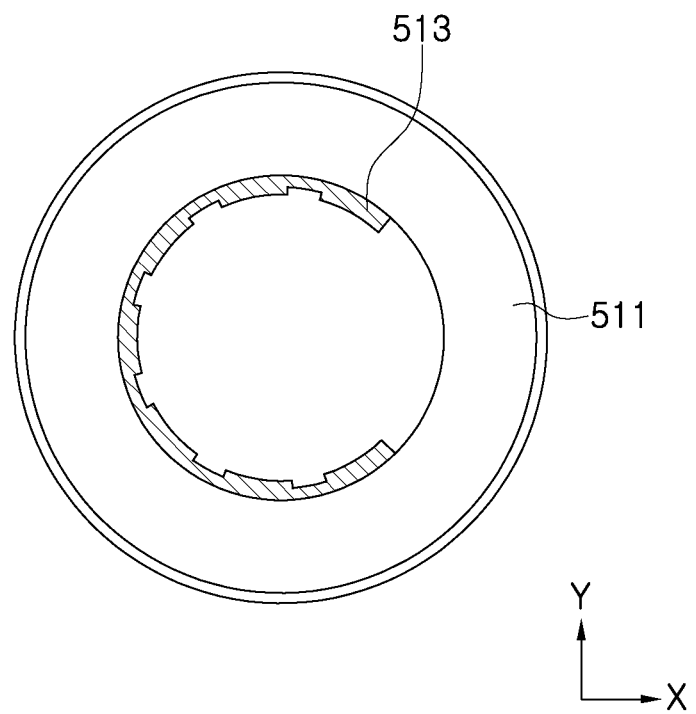

As in FIGS. 12A and 12B, a guide bushing member 511 to which an inner side bushing member 513 having a partially open portion by about a 90 degree angle is coupled may be used. As in FIGS. 13A and 13B, the guide bushing member 511 having the inner side bushing members 513 coupled to opposite ends thereof, respectively, may be used.

Figure 14:
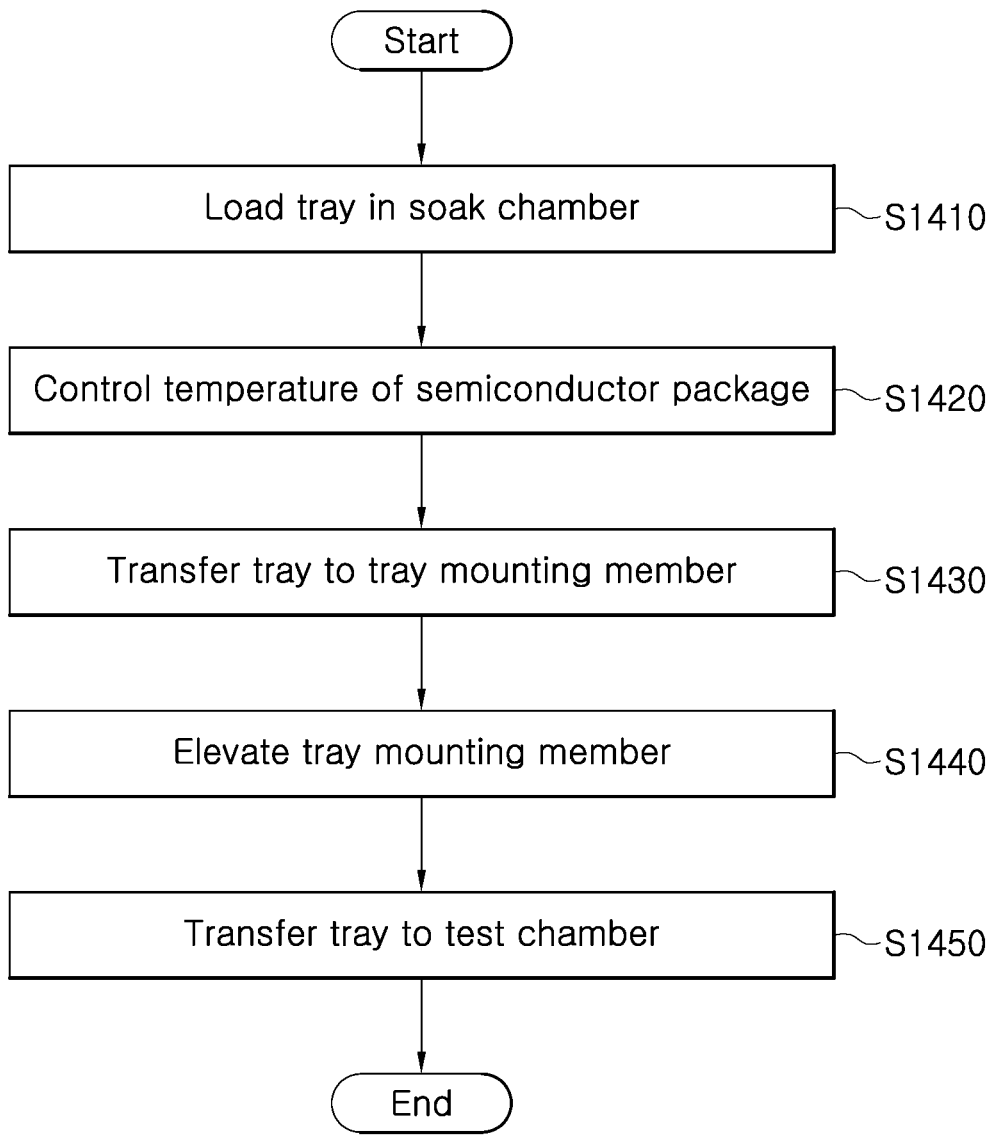
FIG. 14 is a flowchart of a tray transfer method according to the present disclosure.

FIG. 14 is a flowchart of a tray transfer method according to the present disclosure. A tray transfer method according to the present disclosure includes: putting a test tray 20 into a soak chamber 200 in S1410; controlling a temperature of a semiconductor package 10 mounted on the test tray 20 to a set test temperature in S1420; placing/positioning the test trays 20 on tray mounting members 510 and 550, respectively, in S1430; elevating each of the tray mounting members 510 and 550 along the shaft members 591 and 595 in S1440; and transferring the test tray 20 to the test chamber 300 in S1450. Here, the guide bushing members 511 and 551 that are inserted into the corresponding through holes of the tray mounting members 510 and 550, respectively, and configured to move along the shaft members 591 and 595 are provided, and each of the ring members 512 is configured to be inserted into the groove provided on the outer surface of the corresponding one of the guide bushing members 511 and 551.

Figure 15:
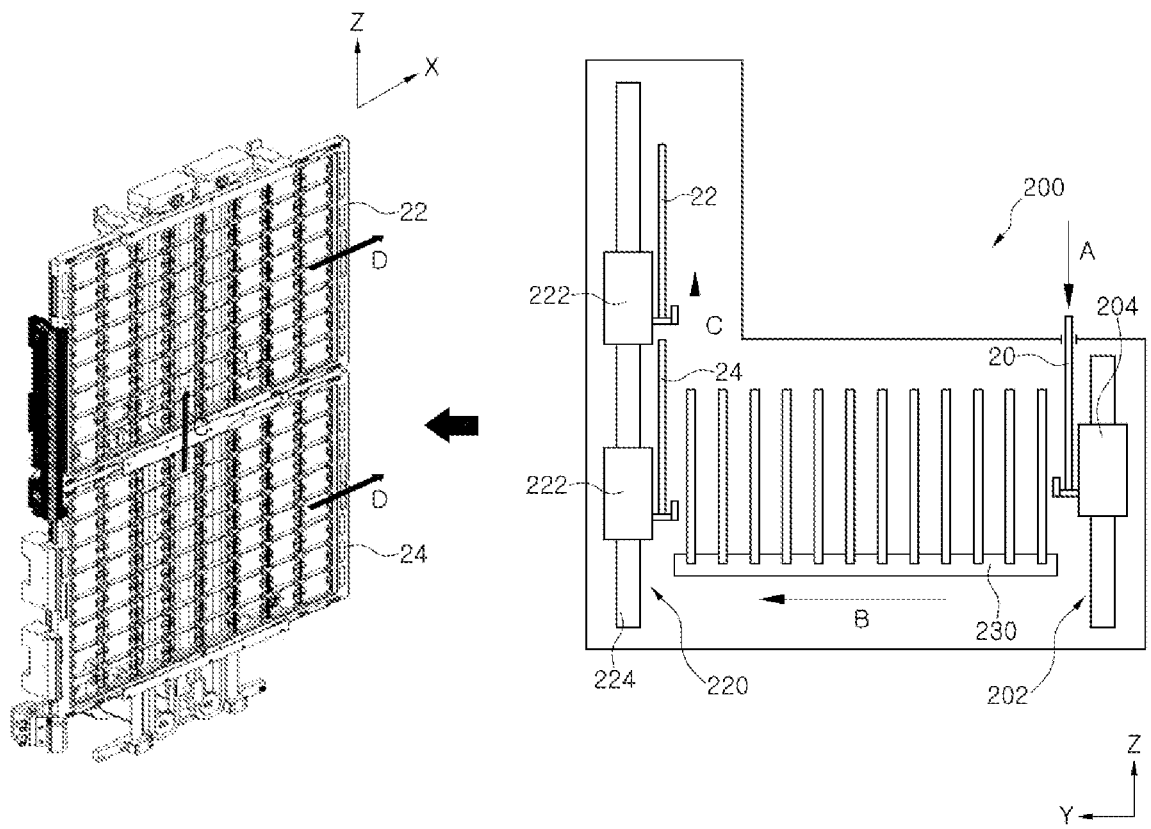
FIG. 15 is a view showing a tray transfer process according to the present disclosure.
Figure 16:
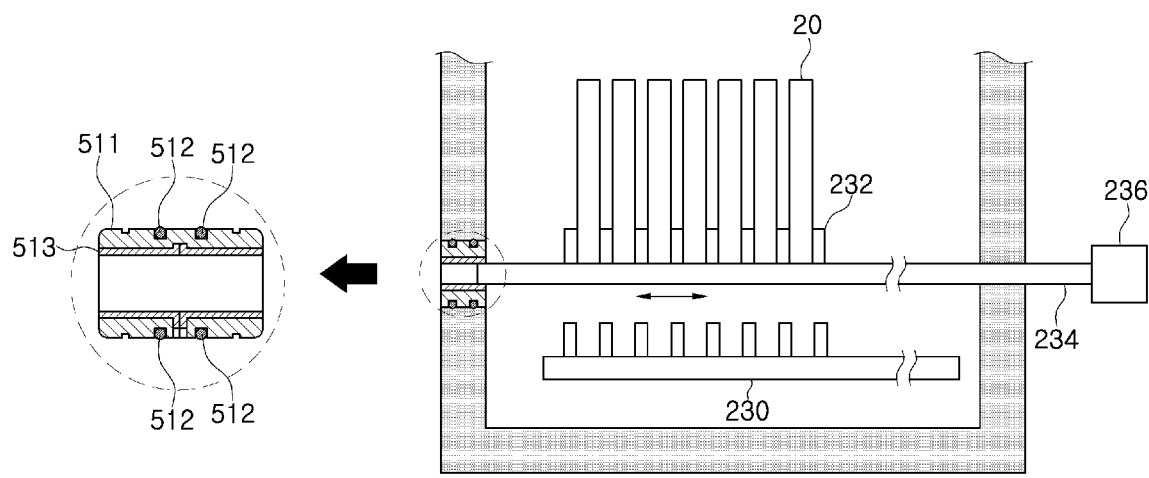
FIG. 16 is a view showing a schematic structure of a tray horizontal transfer device to which an embodiment of the present disclosure may be applied.

When described with reference to FIG. 15, in phase A, the test tray 20 is transferred into the soak chamber 200 in a state of being erected vertically. In phase B, the test trays 20 are stored on the tray storage member 230, and the temperature of the semiconductor package 10 is preheated or precooled to the test temperature. When the test trays 20 are transferred to the tray mounting members 510 and 550, respectively, the tray mounting members 510 and 550 are elevated, whereby, in phase C, one test tray 20 is located at the upper stage and another test tray 20 is located at the lower stage. Thereafter, in phase D, the test tray 20 is moved in a horizontal direction and transferred to the test chamber 300, and a test is performed therefor. FIG. 16 is a view showing a schematic structure of a tray horizontal transfer device to which an embodiment of the present disclosure may be applied. FIG. 16 is a view showing a case in which the bushing device according to the embodiment of the present disclosure is applied to the device for transferring the tray 20 in the horizontal direction described in FIG. 2. FIG. 16 is a view for explaining a horizontal transport device for moving the tray 20 by one slot at a time in the tray storage member 230 configured to store the trays 20 vertically, and the guide bushing member 511 to which the ring member 512 of the present disclosure is mounted on a shell of the guide bushing member 511 may be applied even to the horizontal transfer device such as in FIG. 16.

With reference to FIG. 16, the tray storage member 230 is configured to be movable in the vertical direction, and the tray horizontal transfer device is configured to be movable in the horizontal direction. When it is desired to move the trays 20 by one slot, grippers 232 coupled to the horizontal drive shaft 234 respectively grip each tray 20 at a lower end of the trays 20, and then the tray storage member 230 is lowered, whereby the trays 20 are gripped by the grippers 232. Thereafter, the grippers 232 are moved in the horizontal direction along the horizontal drive shaft 234 by the horizontal drive unit 236 and the trays 20 are also moved in the horizontal direction by the grippers 232. When the movement by one slot distance is completed, the tray storage member 230 is elevated to support each tray 20 from a lower part, and the grippers 232 release the grip so that the trays 20 are supported by the tray storage member 230. In this case, the tray 20 located on the utmost left side will be delivered to the second elevating apparatus 220 of FIG. 2.

On the other hand, the horizontal drive shaft 234 moves in the horizontal direction in contact with a bushing mounted in a hole provided in a wall of the chamber. Similarly, since the inside of the soak chamber 200 is controlled from the low temperature to the high temperature environment, in the case of a general bush, the horizontal drive shaft 234 may be misaligned or friction and damage may occur due to thermal deformation.

Accordingly, the guide bushing member 511 according to the embodiment of the present disclosure may be installed at the inside of the chamber wall, and the ring member 512 may be inserted into the groove provided on an outer circumferential surface of the guide bushing member 511. In addition, an inner bushing member 513 made of a polymer material for preventing friction with the horizontal drive shaft 234 and damage may be configured to be inserted into the inner side of the guide bushing member 511 to contact the horizontal drive shaft 234.

The present embodiment and the drawings attached to the present specification merely clearly show a part of the technical idea included in the present disclosure, and it will be apparent that all possible modifications and specific embodiments that those skilled in the art may easily infer within the scope of the technical idea included in the specification and drawings of the present disclosure are included in the scope of the present disclosure.

Therefore, the spirit of the present disclosure should not be limited to the described embodiments, and not only the claims to be described later, but also all of the claims and equivalents or equivalent modifications will be said to belong to the scope of the spirit of the present disclosure.

What is claimed is:

1. A tray elevator of a test handler comprising:
a tray mounter on which a test tray is seated and having a support part and a through hole vertically penetrating the support part;
a shaft vertically extending through the through hole of the tray mounter and configured to provide a path for elevating or lowering the tray mounter;
a guide bushing including an outer surface and a groove at the outer surface, inserted into the through hole of the tray mounter, and configured to move along the shaft;
a ring inserted into the groove of the guide bushing; and
an inner side bushing inserted into an inside of the guide bushing and contacting the shaft,
wherein the guide bushing and the inner side bushing each have a "C" shape having a partially open portion.

2. The tray elevator of claim 1,
wherein a diameter of the guide bushing is smaller than a diameter of the through hole.

3. The tray elevator of claim 2,
wherein a thickness of the ring is greater than a depth of the groove of the guide bushing.

4. The tray elevator of claim 3,
wherein the ring contacts an inner wall of the through hole.

5. The tray elevator of claim 1,
wherein the groove is provided in a plural,
wherein the ring is provided in a plural,
wherein each ring of the plurality of rings is inserted in a corresponding groove of the plurality of grooves, and
wherein each ring of the plurality of rings is an O-ring.

6. The tray elevator of claim 1,
wherein the inner side bushing is made of a polymer material having a friction coefficient lower than a friction coefficient of the guide bushing.

7. A tray elevator of a test handler comprising:
a tray mounter on which a test tray is seated and having a support part and a through hole vertically penetrating the support part;
a fixed fastening member protruding from the tray mounter;
a timing belt pully including:
 a chain, and
 a circular pulley having a teeth coupled to an inner side of the chain to elevate or lower the tray mounter;
a correction fastening member mounted on the timing belt pully and rotatably engaged with the fixed fastening member;
wherein the timing belt pully is configured to elevate or lower the tray mounter via the fixed fastening member and the correction fastening member engaged with each other;
a shaft vertically extending through the through hole of the tray mounter and configured to provide a path for elevating or lowering the tray mounter;
a guide bushing including an outer surface and a groove at the outer surface, inserted into the through hole of the tray mounter, and configured to move along the shaft;
a ring inserted into the groove of the guide bushing; and
an inner side bushing inserted into an inside of the guide bushing and contacting the shaft,
wherein the guide bushing and the inner side bushing each have a "C" shape having a partially open portion.

8. The tray elevator of claim 7,
wherein the correction fastening member is rotatably engaged with the fixed fastening member.

9. The tray elevator of claim 7,
wherein a diameter of the guide bushing is smaller than a diameter of the through hole.

10. The tray elevator of claim 8,
wherein a thickness of the ring is greater than a depth of the groove of the guide bushing.

11. The tray elevator of claim 7,
wherein the groove is provided in a plural,
wherein the ring is provided in a plural,
wherein each ring of the plurality of rings is inserted in a corresponding groove of the plurality of grooves, and
wherein each ring of the plurality of rings is an O-ring.

12. The tray elevator of claim 7,
wherein the inner side bushing is made of a polymer material having a friction coefficient lower than a friction coefficient of the guide bushing.

13. The tray elevator of claim 12,
wherein a mounting groove for mounting the inner side bushing is provided in an inner side center of the guide bushing,
wherein the inner side bushing is provided as a pair of inner side bushings, and
wherein each inner side bushing of the pair of inner side bushings includes a flange portion inserted into the mounting groove.

14. A test handler comprising:
a loading section where a semiconductor package is carried in or taken out;
a soak chamber configured to preheat or precool the semiconductor package mounted on a test tray;
a test chamber configured to perform a test by pressing the semiconductor package transferred from the soak chamber with a test interface unit;
a desoak chamber configured to discharge the semiconductor package on which the test has been completed to the loading section; and
a tray elevating and lowering unit disposed in the soak chamber or the desoak chamber,
wherein the tray elevating and lowering unit comprises:
a tray mounter on which the test tray is seated;
a shaft vertically extending through a through hole of the tray mounter and configured to provide a path for elevating or lowering the tray mounter;
a guide bushing inserted into the through hole of the tray mounter, and configured to move along the shaft;
an inner side bushing inserted into an inside of the guide bushing and contacting the shaft; and
a ring member inserted into a groove provided on an outer surface of the guide bushing and contacting an inner wall of the through hole of the tray mounter, and
wherein the guide bushing and the inner side bushing each have a "C" shape having a partially open portion.

15. The test handler of claim 14,
wherein the tray elevating and lowering unit further comprises an inner side bushing member inserted into the guide bushing,
wherein the inner side bushing member contacts the shaft, and wherein the inner side bushing member is made of a polymer material having a friction coefficient lower than a friction coefficient of the guide bushing.

* * * * *